June 29, 1948. P. F. HACKETHAL ET AL 2,444,196
PROPELLER CONSTRUCTION
Filed Feb. 5, 1943 3 Sheets-Sheet 1
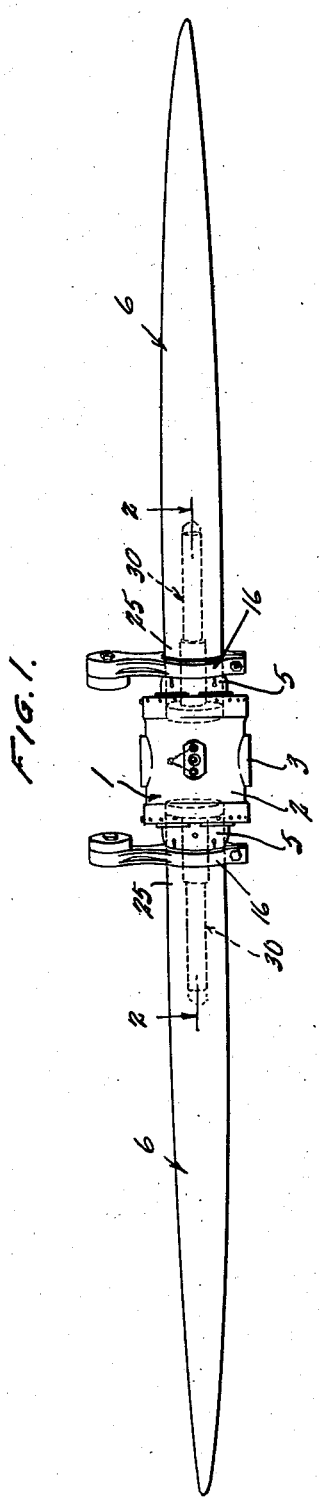
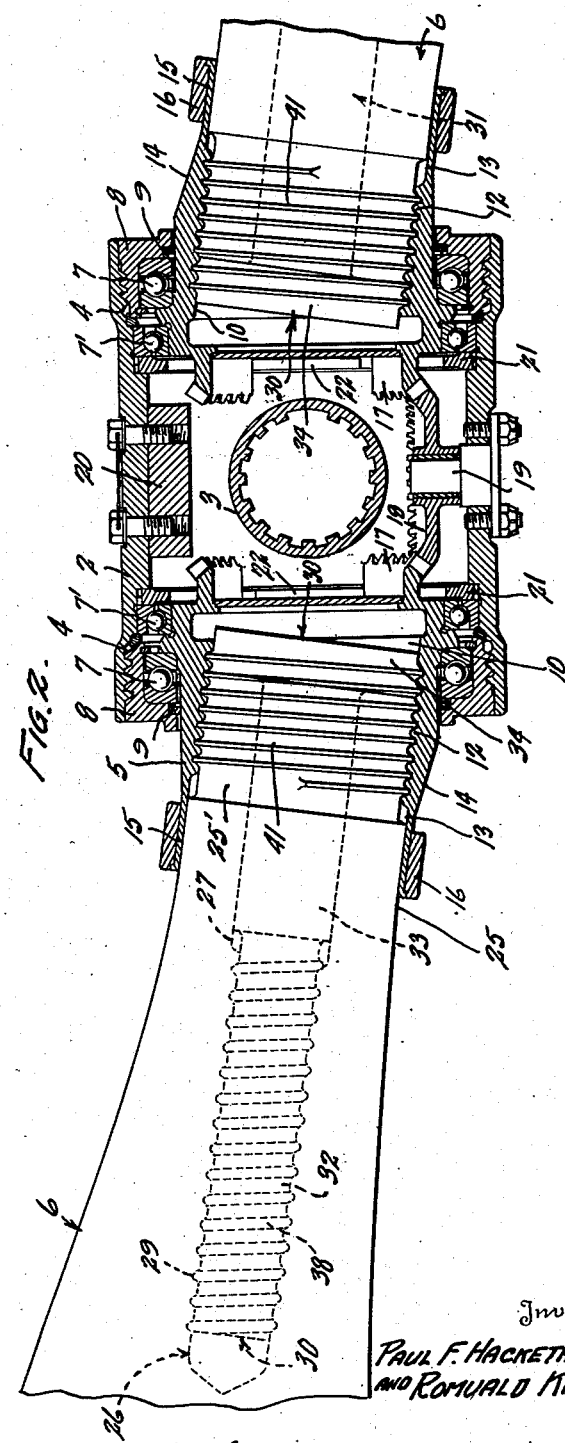
Inventors
PAUL F. HACKETHAL
AND ROMUALD KAREY
By Semmes, Keegin, Beale & Semmes
Attorneys June 29, 1948.    P. F. HACKETHAL ET AL    2,444,196
PROPELLER CONSTRUCTION
Filed Feb. 5, 1943    3 Sheets-Sheet 2
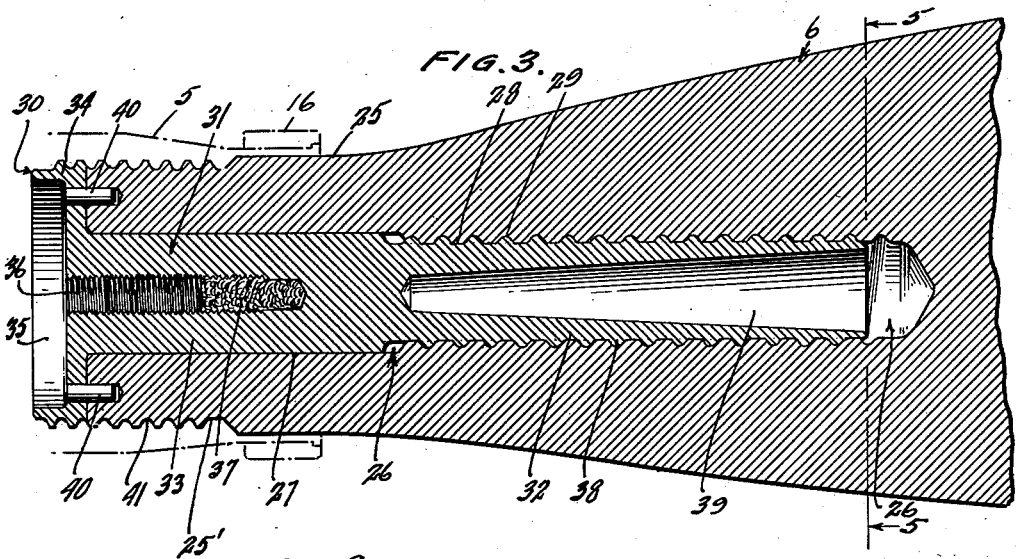
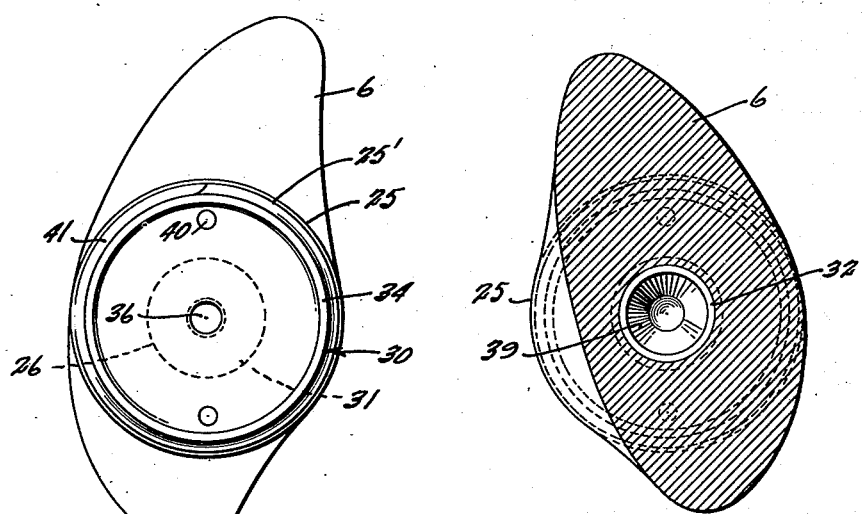
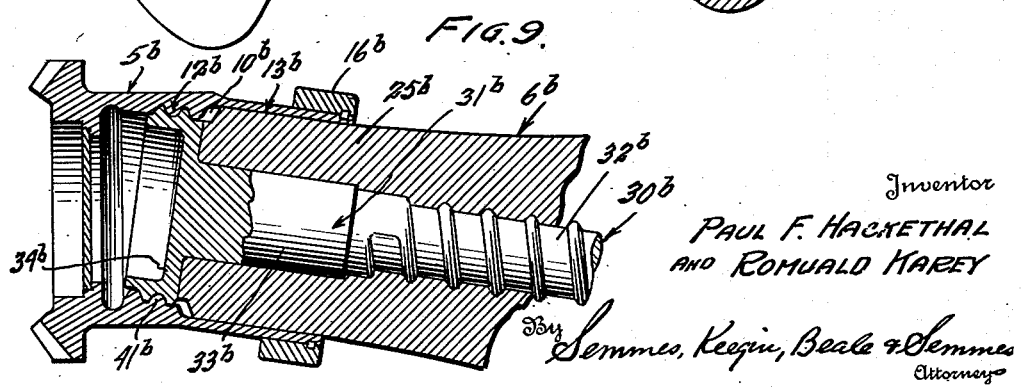
Inventor
PAUL F. HACKETHAL
AND ROMUALD KAREY
By Semmes, Keegin, Beale & Semmes
Attorneys

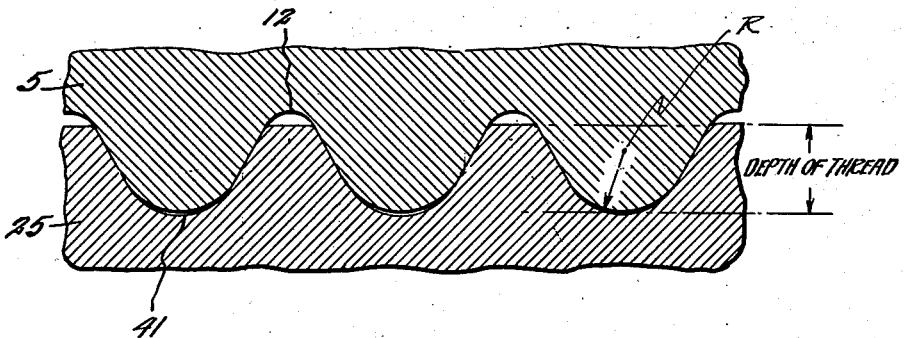
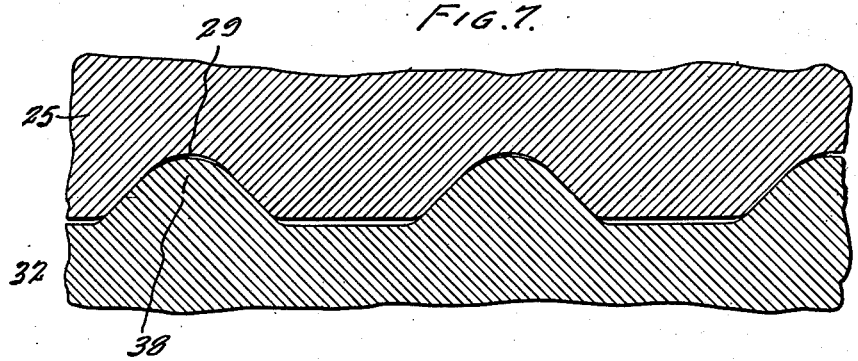
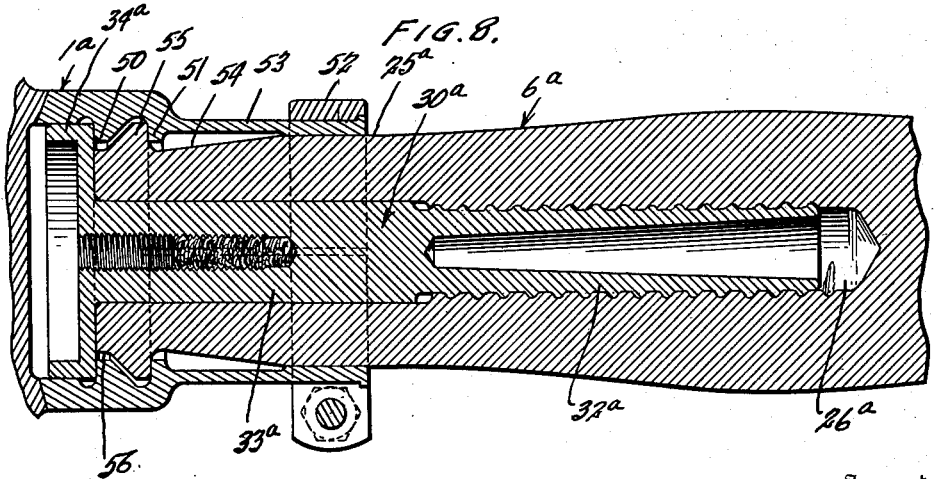

Patented June 29, 1948

2,444,196

UNITED STATES PATENT OFFICE 2,444,196

PROPELLER CONSTRUCTION

Paul F. Hackethal, Cockeysville, and Romuald Karey, Baltimore, Md., assignors to Everel Propeller Corporation, Baltimore, Md., a corporation of Maryland Application February 5, 1943, Serial No. 474,875

8 Claims. (Cl. 170—173)

The present invention relates to propeller construction and more particularly to means for mounting the blade of an aircraft propeller in its hub, whereby the imposed operation stresses are distributed throughout the blade shank.

In the normal operation of aircraft propellers, high stresses are induced in the blade shank due to centrifugal force and the bending moments of the blade. In prior propellers of adjustable, controllable or automatic variable pitch type, where the blade shank is mounted in the hub, or is provided with a sleeve which is rotatable within the hub, the stresses imposed by the centrifugal loads and bending moments will be combined and concentrated in a relatively short section of the blade shank adjacent the hub. In order to provide for this high stress concentration and to keep the stresses within allowable limits, the section of the conventional shank, adjacent the hub must be made unusually large. This increase in shank section will obviously result in an increase in the total centrifugal load and therefore necessitate the use of heavier hub sections, and, in the case of controllable or variable pitch propellers, larger and heavier thrust bearings.

It is an object of this invention, therefore, to anchor the blade of an aircraft propeller in its hub by means whereby the stresses imposed by the centrifugal loads and bending moments of the blade are distributed over a considerable area of the blade shank thereby preventing their concentration in confined areas with consequent necessity for increase in shank size in these areas to maintain the stresses within allowable limits.

Another object of this invention is to provide a rigid means for anchoring the blade of an aircraft propeller in its hub whereby the loads are gradually transferred to the hub with a consequent gradual change in stress along the entire shank of the blade.

Yet another object of the invention is to anchor a nonmetallic blade into a metallic hub by the use of a metallic insert secured in the blade shank, the parts being designed to compensate for the moduli of elasticity of the different materials.

A further object is to provide a screw threaded anchorage for attaching the blade shank in an aircraft propeller assembly, such anchorage being so proportioned with respect to the blade shank that the centrifugal loading is substantially equally distributed over the entire screw threaded portion of the anchorage.

A still further object of our invention is to provide a propeller blade anchorage of the above type which employs a thread form which will give maximum shear area and minimum stress concentration.

Yet another object of the invention is to provide an anchorage for attaching propeller blades into a propeller assembly which incorporates means for statically balancing the propeller assembly.

Other objects and advantages will be apparent to those skilled in the art from the following specification and by reference to the several figures of the drawings which form a part thereof.

In the drawings in which like characters of reference are employed to designate like parts throughout the several views:

Figure 1 is an elevational view of a propeller assembly of automatic variable pitch type employing the anchorage means for the blades herein disclosed.

Figure 2 is a fragmental transverse sectional view taken along the line 2—2 of Figure 1 and looking in the direction of the arrows.

Figure 3 is a sectional view taken along the axis of the shank portion of one of the propeller blades.

Figure 4 is an end view of the blade looking toward the blade tip.

Figure 5 is a cross sectional view of the blade taken on the line 5—5 of Figure 3 looking in the direction of the arrows.

Figure 6 is an enlarged sectional view illustrating the form of thread employed for anchoring the blade with its flange.

Figure 7 is an enlarged sectional view illustrating the thread form employed for attaching the anchorage insert into the blade shank.

Figure 8 is a fragmental sectional view taken along the axis of a propeller blade illustrating the application of our anchorage to an adjustable type propeller.

Figure 9 is a fragmental sectional view illustrating a modified anchorage.

As stated, the invention comprises, in its broadest concept, an anchorage for attaching blades into a propeller assembly so designed that the imposed operating loads are evenly distributed throughout the entire blade shank. While the anchorage herein described is particularly adaptable for attaching nonmetallic blades such as those fabricated from plastic impregnated compressed wood, it is to be understood that it is equally adaptable in attaching metallic blades.

Generally, the anchor comprises a metallic insert constituting in effect a screw, a portion of whose shank is threaded with a novel thread form, to closely mate with an axial bore in the blade shank, and a radially enlarged head portion adapted to closely abut the end of the blade shank.

In one embodiment of the invention, the end of the blade shank and the periphery of the insert head are formed with a continuous external screw thread, also of special form, by means of which both the blade and insert are securely affixed in a similarly threaded mounting sleeve which forms a part of the propeller hub assembly. The cross sectional areas of the mating threaded portions of the anchorage and blade, and the blade shank and sleeve are so proportioned that the moduli of elasticity of the different materials are compensated for and thereby effect a better distribution of the tensile stresses over the entire threaded areas. The threaded portion of the insert, which is adapted to take centrifugal loads, is positioned within the blade shank axially removed from the mounting sleeve where stresses due to the bending moment of the blade are imposed. Thus the operating stresses are distributed over a substantial area of the blade shank.

Referring now to the specific embodiment of the invention, illustrated in Figures 1 through 5 of the drawings, the numeral 1 represents a hub for a two-blade propeller of automatic variable pitch type which comprises a blade mounting shell 2 having a splined transverse shaft attaching sleeve 3.

Each end of the shell 2 is bored as at 4 to receive a member designated as a sleeve 5. The sleeve 5 in effect is a portion of the hub assembly, but inasmuch as it is fixed with respect to the blade shank, while rotatable with respect to the hub, it will be treated in this application as a portion of the blade and serves to operatively couple a propeller blade 6 with the hub.

The sleeve 5 is mounted for anti-frictional rotation by means of a thrust bearing 7 and a radial bearing 7' within the bore 4. An internally flanged ring 8 fitted with an oil packing element 9 is threaded into the end of the bore 4 and serves both to load the bearing 7 and to block the sleeve 5 against outward displacement.

Each sleeve 5 is bored as at 10 at an angle to its rotational axis, and this bore is provided with a threaded portion 12 and a smooth portion 13. The exterior periphery of the sleeve is tapered inwardly as indicated at 14, concentrically with the axis of the bore 10, to progressively reduce the wall section of the sleeve substantially over the area of the sleeve which includes the threaded portion 12. The outer extremity of the sleeve constitutes a slit skirt 15 which is fitted with a clamping member 16 for maintaining the blade 6 against rotation within the sleeve. The clamp 16 may, if desired, constitute an adjustable counterweight as illustrated in Figure 1.

Since the sleeves 5 are freely rotatable within the hub and since the blades are positioned in the sleeves at an angle to the axis of their rotation, forces reacting on the rotating propeller will cause the blades to move through the arc of a cone and thus assume the correct pitch for any conditions of flight.

In order to assure synchronous pitch changing movement of the two blades, the inner end of each sleeve 5 is provided with a bevel gear segment 17 which meshes with a common bevel pinion 18 idly mounted on an internally projecting radial stud 19 carried by the shell 2, as shown in Figure 2. A counterweight 20 is secured to the opposite side of the shell 2 to balance the above synchronizing mechanism.

An adjustable stop member comprising a ring 21 is fixedly positioned in the shell 2 adjacent the inner end of each sleeve 5. The rings 21 are provided with internal lugs 22 adapted to abut the gear segments 17 and serve to limit the amount of rotational movement of the sleeves 5 and consequently the amount of pitch changing movement of the blades.

The anchorage means for the blade, which forms the basis of this invention, is best illustrated in Figures 2 and 3 where the shank portion 25 of the propeller blade 6 is shown relieved or reduced at 25' and axially bored at 26 to a depth terminating approximately in the maximum cross sectional area of the blade. The bore 26 may be stepped as shown in Figure 3, the portion 27 at the inner end of the shank 25 having the larger diameter and being bored smooth. This portion 27 of the bore extends to a position slightly beyond that defined by the outer extremity of the sleeve 5 when the blade is operatively positioned within the sleeve. The smaller diametered extension 28 of the stepped bore 26 is provided with a continuous female thread 29 of a form to be described in detail further in this specification.

A metallic anchor member designated generally as 30 has a shank 31 divided into a threaded portion 32 and an unthreaded portion 33 which lies adjacent a head or flange 34 which has a diameter substantially equal to the diameter of the end of the blade shank 25 and which is formed with a concentric depression 35. The shank 31 is centrally bored and threaded, as shown at 36, to provide a pocket for the reception of a weighting material 37 such as lead wool. If, after assembly, the propeller is found to be unbalanced, this material 37 is packed into the pocket 36, the threaded walls of the pocket serving to maintain the material in place.

The portion 32 of the shank of the anchor 30 is provided with a continuous male thread 38 which conforms accurately with the thread 29 of the bore 26 to provide thereby a continuous closely engaging threaded union between the anchor 30 and the blade 6. While the shank 31 of the anchor 30 is shown to be cylindrically turned, it is to be understood that it may also be machined with a taper which will fit closely in a similarly tapered socket 26 in the blade shank. In either case, a continuous engagement of the entire thread 38 is preferably made with the thread 29 in the blade shank.

In order to compensate for the difference in the moduli of elasticity of a metallic insert and a wooden blade, to thereby uniformly load this thread, the cross sectional area of the threaded portion 32 of the shank 31 is differentially reduced by the provision of an axial tapered bore 39 which extends substantially the length of the thread 38. The determination of the size and shape of this bore will be set forth later.

The anchor shank 31 is screwed up into the socket 26 until the head 34 engages the end of the blade shank and the end of the shank 31 terminates substantially in the zone of maximum cross sectional area of the blade. After the anchor has thus been inserted it is secured against rotation in the blade shank by doweling such as is indicated at 40. A continuous thread 41 of a form to accurately mate with the thread 12 in the sleeve 5 is next milled in both the relieved end 25' of the blade shank 25 and the periphery of the anchor head 34 to provide means for anchoring the blade in the sleeve 5.

The proportionate diameters and lengths of the unthreaded portion 33 and the threaded portion 32 of the anchor shank 31 are so chosen that when the shank is inserted in the blade the unthreaded portion 33 carrying the bending loads of the blade which are imposed adjacent the sleeve, will project slightly beyond the end of the sleeve 5 so that the centrifugal loads carried by the threaded portion 32 impose their stresses in a zone entirely removed from those imposed by the bending moment and thereby prevent concentration of stresses caused by the two forces and distribute them over the whole blade shank area. The relative diameters of the blade shank and insert will be determined in order that the shank and insert will bear such load that each element will be stressed to allow the desired safety factor. For instance, the diameter of the insert will be less than ⅔ the diameter of the blade shank.

The length of the anchor head 34 with respect to the threaded portion 41 of the blade shank is proportioned to distribute the centrifugal load between the blade shank and anchor head, and the taper 14 of the metallic sleeve 5 as heretofore mentioned, is also chosen to compensate for the difference in moduli of elasticity so that the entire thread will be equally loaded.

Thus formed, the blades with their anchors are screwed up into the sleeves 5, their proper pitch is determined, and the clamps 16 which constrict the split skirt portions 15 of the sleeves 5 about the blade shanks are tightened to secure the blade against further rotation. Static balance of the complete propeller may then be effected as described above by the addition of weighting material 37 to the blade on the lighter side.

It is to be noted that the foregoing construction, while securely anchoring the blade 6 into the sleeve 5, also permits of pitch adjustment of the blade. Such adjustment is made by rotating the blade within the mounting sleeve, and after the blade is turned to the desired pitch, it is maintained at such pitch by the frictional engagement of the slit skirt 15 of the sleeve with the blade shank as effected by the clamp 16.

The thread forms which constitute an important feature of this invention are clearly illustrated in the enlarged, diagrammatic Figures 6 and 7; Figure 6 illustrating the thread connecting the blade shank with the mounting sleeve 5, and Figure 7 illustrating the thread by which the anchor member 30 is joined to the blade shank 25.

The conventional thread forms, which heretofore have been employed for such purposes, have been found to produce high stress in the wood of the blade. This is due to a stress concentration associated with the sharp corners and minute radii presented at the root diameters of both the male and female threads. We have found that by providing a large radius at the root of the thread in the wooden blade which forms, in effect, a substantially round bottom thread, we have been able to increase the safe load by as much as fifty per cent over the conventional thread. This radius at the root of our thread may be expressed generally as being greater than substantially one-half the depth of the thread. Such a thread form is graphically shown in Figure 6, the upper part of the figure representing a portion of the hub sleeve 5 while the lower half represents the wooden blade shank 25. In this figure the radius forming the bottom of the thread is approximately ⅔ of the depth of the thread, which we find is preferable under most circumstances.

A substantially similar thread form is also provided for securing the anchor 30 into the blade shank as shown in Figure 7 where the upper part of this figure represents the wooden blade shank 25 and the lower part of the metallic anchor 32. In both of these threads it will be observed that a great amount of shear area has been provided in the wood sections.

In connection with all the threads discussed above, it is preferable that there be continuous engagement of the whole bearing surfaces of the mating threads throughout their entire length.

In designing the anchor member 30 to perform the functions above set forth, the total centrifugal load of the blade is first determined; after this, the proportion of the centrifugal load to be carried by the metallic anchor member and the wood blade is calculated. These calculations may be made by well-known methods and, when made, the required diameter of the unthreaded portion 33 of the anchor shank may be determined by methods of constant deformation.

With the calculated diameter of the unthreaded portion 33 of the anchor determined, the nominal diameter of the internal threads 29 in the blade shank may be calculated, and, knowing the load in the metal and assuming a given shearing stress in the wood shank, the number of threads required on the shank 31 may be found. It is to be noted that if, after the determination of the number of such threads, the estimated length of the shank will not permit the unthreaded portion 33 to extend beyond the rim of the sleeve 5, the overall length of the shank 31 may be increased slightly if permissible, or a slightly higher shear stress in the wood may be used in the calculations.

Since an amount of wood equal to the volume of the anchor shank is removed from the blade shank in providing the bore 27, the tensile stress at the relieved section 25' of the blade shank must also be calculated.

From the above stress calculations it will be found that at the end of the sleeve 5, the load in the wood shank 25 of the blade has been considerably reduced over a conventionally anchored blade. Also, since the inserted metal anchor absorbs a portion of the bending moment, the stress in the blade shank at the sleeve 5 is still further reduced.

As above stated, uniform thread loading is provided by compensating for the moduli of elasticity of the different materials by controlling the mass of the several materials. To accomplish this uniform thread loading, in the case of the anchor insert 30, the threaded portion 32 of the anchor shank is relieved by providing the tapered axial bore 39. Since the load distribution throughout the shank is known, the division of the load throughout the threaded portion 32 of the anchor shank may be traced and the shape and size of the bore 39 may be thus determined to remove the amount of metal from the shank to give the required cross sectional area or wall thickness at any point along the threaded portion of the shank. While under certain conditions the taper of this bore 39 may be straight as shown in Figure 3, it will usually be hyperbolic.

In a like manner the taper 14 of the outer surface of the sleeve 5 may be determined to evenly distribute the load imposed on the threads 41 of the blade shank. It is to be noted that an additional reduction of the loads on the threads 41 will be obtained by a by-passing of a portion of the load through frictional engagement between the clamp 16 and skirt 15.

An anchorage insert made and applied according to the above disclosure not only provides a rigid means of anchoring the blade into a propeller assembly but will also substantially reduce the amount of stress in the wooden blade shank and, by distributing the loads over the whole shank area, will give a gradual change of stress throughout the shank. In other words, the magnitudes of centrifugal loading in the wooden blade shank are small; the tensile stresses per square inch due to the combined loads of both centrifugal force and bending moment are also low; and, since such loads are confined to different parts of the blade shank, a distribution of their stresses over a considerable area is effected. All of these advantages are in direct contrast to the conventionally anchored blade where abrupt changes and high magnitudes of the imposed stresses are confined to a comparatively narrow zone of the blade shank.

In addition, the compensation of moduli of elasticity and the utilization of our thread designs produce an even distribution of the loads reacting on the blade over the entire threaded areas and thereby still further reduce the stress in the wood blade shank.

While primarily designed for the automatic variable pitch propeller above described and illustrated in Figures 1 and 2, our anchorage has been found to function with equal efficiency in other propellers employing detachable blades. Such an adaption is illustrated in Figure 8 which shows a fragment of an adjustable pitch propeller employing the standard split hub 1—a provided with internal steps 50 and 51 to take the centrifugal load of the blade and a clamping ring 52 adapted to constrict the skirt portion 53 of the hub to maintain the adjusted pitch of the blade.

The blade 6—a which, like the blade 6 is of wooden fabrication, has the inner extremity of its shank 25—a tapered as shown at 54 and provided with an external flange 55 which is tapered likewise inwardly to the reduced end 56 of the blade shank.

The metallic anchor insert 30—a which is similar to the anchor member 30 is inserted in the bore 26—a in the manner described above, that is, so that the unthreaded portion 33—a of its shank projects slightly beyond the end of the hub and the threaded portion 32—a of the shank extends beyond that point to approximately the point of maximum cross sectional area of the blade.

The head 34—a of the anchor in this case, is not threaded as in the anchor 30, but extends radially to substantially the diameter of the blade flange 55. In attaching the blade to the hub, the flange 55 engages the outer step 51 of the hub while the head 34—a, which in effect replaces the bottom flange of the standard blade, engages the inner hub step 50 to divide the centrifugal load between the blade and anchor. The blade is adjusted in the hub to the desired pitch and is thereafter fixedly maintained at that pitch by virtue of clamp ring 52.

Comparison of Figure 8 with Figure 2 will clearly show the similarity of the two blade anchorages and the advantages and results obtained hold equally true in both cases.

Under certain conditions an anchorage such as illustrated in Figure 9 may be desirable. In this instance, instead of the blade shank being screw threaded to take a portion of the centrifugal load, the blade shank 25—b of the blade 6—b is formed smooth and the entire centrifugal load is taken by the insert 30—b. Such a construction is completely satisfactory in lower horsepower propellers and materially reduces the cost of manufacture.

As shown in Figure 9, the blade mounting sleeve 5—b of a variable pitch propeller of the type shown in Figure 2 has a bore 10—b having a smooth portion 13—b and a threaded portion 12—b. In the present sleeve the portion 13—b is machined smooth to a greater depth than in the case of the sleeve 5 reducing the threaded portion 12—b to a length just sufficient to engage the threaded head of the insert 30—b. The shank 25—b of the blade 6—b is unthreaded and is adapted to be frictionally engaged by the unthreaded portion 13—b of the shank bore 10—b.

The insert 30—b is substantially similar to the insert 30, that is, it is provided with a shank 31—b having a threaded portion 32—b adapted to engage the blade and extend to a region substantially in the area of maximum cross section of the blade; and a smooth portion 33—b, adjacent the head 34—b, which extends slightly beyond the outer extremity of the sleeve 5—b. Differing from the structure illustrated in Figure 2, the head portion 34—b, in this case, is made with a smaller diameter than the shank of the blade and is peripherally threaded to engage the threaded portion 12—b of the sleeve.

The screw threads employed in this structure may be of round bottom form as above described, or if desired, the thread attaching the insert to the sleeve 5—b may be of conventional design such as a buttress thread although the round bottom thread may be considered the more desirable because of its increased shear area.

It must be understood that only preferred embodiments of our inventive concept are herein shown and described and various changes may be made therein by those skilled in the art without departing from the spirit of the invention or the scope of the appended claims.

We claim:

1. An anchorage for mounting a non-metallic propeller blade into a hub, comprising a metallic element having a head portion serving to fix the element against radial displacement with respect to the rotational axis of the hub and a shank portion provided with screw threads on at least a portion of its length for threaded engagement with the blade, said shank portion having its outer surface cylindrical and having its cross sectional area differentially reduced in the threaded portion to compensate for the difference in the modulus of elasticity of the non-metallic blade and the metallic anchorage element thereby to equally load the threaded section.

2. In a propeller construction including a hub and a non-metallic blade mounted in the hub, an elongated metallic anchor member having a flanged head serving to attach the anchor member to the hub and a shank of cylindrical external formation positioned axially within the blade shank and having a portion of its length threadedly engaged by the blade shank only in a zone axially spaced from said hub, said anchor member shank having a diameter less than two-thirds the diameter of the blade and having its cross sectional area differentially reduced in the threaded portion to compensate for the difference in the modulus of elasticity of the non-metallic blade and the metallic anchor member to equally load the threaded section.

3. An anchorage for propeller blades comprising an internally threaded tubular sleeve for receiving the shank of the propeller blade, an elongated cylindrical metallic member having a shank secured within the blade shank and a head abutting the end of the blade shank, said head being enlarged radially to a diameter substantially equal to the diameter of the blade shank, a continuous external thread formed on the blade and head for engaging the internally threaded sleeve, said external thread having a radius at the root diameter thereof greater than substantially one-half the depth of the thread the shank of said metallic member having its cross sectional area differentially reduced in the threaded portion to compensate for the difference in the modulus of elasticity of the non-metallic blade and the metallic member to equally load the threaded portion.

4. An anchorage for non-metallic propeller blades comprising an internally threaded tubular metallic sleeve for receiving the shank of the propeller blade, an elongated metallic member having a shank secured within the blade shank and a head abutting the end of the blade shank, said head being enlarged radially to a diameter substantially equal to the diameter of the blade shank, a continuous external thread formed on the blade shank and head for engaging the internally threaded sleeve, said tubular sleeve being externally tapered in the threaded portion thereof to reduce the cross section of the sleeve toward its outer end to thereby compensate for the difference in the modulus of elasticity of the non-metallic blade and the metallic sleeve for equally loading said threads.

5. In a propeller construction including a hub and a blade mounted therein, an anchor member for securing the blade to the hub, said anchor member having a head portion secured to the hub and a shank having a screw-threaded portion in threaded engagement with the blade, the outer surfaces of said shank being cylindrical and the cross-sectional area of said screw-threaded portion of the shank being progressively reduced from the head end thereof to the opposite end to thereby compensate for differences in moduli of elasticity of the blade and anchor.

6. In a propeller construction including a hub and a non-metallic blade mounted therein, a metallic anchor member for securing the blade to the hub, said anchor member having a head portion secured to the hub and a shank having a screw-threaded portion in threaded engagement with the blade, said shank portion being taper bored axially to the depth of the threaded portion for progressively reducing the cross-sectional area of said threaded portion to compensate for differences in moduli of elasticity between the non-metallic blade and the metallic anchor.

7. In a propeller construction, a hub having a tubular blade mounting element, a blade having a smooth shank mounted in said tubular element, and an elongated cylindrical anchor member having one of its ends externally flanged and secured within the tubular element and its opposite end screw-threadedly secured within the blade shank, the cross-sectional area of the portion of the anchor screw-threadedly engaged within the blade shank being progressively reduced from the portion adjacent the flanged end outwardly to compensate for differences in moduli of elasticity of the blade and anchor and thereby equally load the screw-threads when the blade is subjected to the action of centrifugal force.

8. In a propeller construction, a non-metallic blade having a smooth shank, a hub, a tubular member carried by the hub and adapted to receive the end of the blade shank, and an elongated cylindrical metallic anchor member having one of its ends externally flanged and threadedly secured within the tubular member and its opposite end having an externally screw-threaded portion threadedly secured within the blade shank, said threaded portion being taper bored axially to progressively reduce the cross-sectional area of the threaded portion from the end thereof nearest the flange to the opposite end to compensate for the differences in moduli of elasticity of the anchor member and blade.

PAUL F. HACKETHAL.
ROMUALD KAREY.

REFERENCES CITED

The following references are of record in the file of this patent:

UNITED STATES PATENTS

| Number | Name | Date |
| --- | --- | --- |
| 655,033 | Vanderman | July 31, 1900 |
| 1,509,804 | Dicks | Sept. 23, 1924 |
| 1,769,801 | McCauley | July 1, 1930 |
| 1,805,149 | Nelson | May 12, 1931 |
| 1,829,437 | Clay | Oct. 27, 1931 |
| 1,844,382 | Dardelet | Feb. 9, 1932 |
| 1,860,522 | Arnold | May 31, 1932 |
| 1,890,932 | Briner | Dec. 13, 1932 |
| 1,972,487 | Hoover | Sept. 4, 1934 |
| 1,980,272 | Havill et al. | Nov. 13, 1934 |
| 2,052,019 | Baker | Aug. 25, 1936 |
| 2,115,454 | Berliner | Apr. 26, 1938 |
| 2,219,303 | Fraser | Oct. 29, 1940 |
| 2,275,053 | Reissner | Mar. 3, 1942 |
| 2,297,142 | German | Sept. 29, 1942 |
| 2,311,329 | Caminez | Feb. 16, 1943 |

FOREIGN PATENTS

| Number | Country | Date |
| --- | --- | --- |
| 443,750 | Great Britain | Mar. 5, 1936 |
| 565,621 | France | Jan. 31, 1924 |
| 649,023 | France | Dec. 17, 1928 |
| 813,654 | France | June 7, 1937 |